(12) United States Patent
Mizusaki et al.

(10) Patent No.: US 8,192,886 B2
(45) Date of Patent: Jun. 5, 2012

(54) FUEL CELL STACK WITH POWER COLLECTING TERMINALS

(75) Inventors: Kimiharu Mizusaki, Utsunomiya (JP); Mitsuru Sayama, Utsunomiya (JP); Tadashi Nishiyama, Sakura (JP); Toshiki Kawamura, Niiza (JP); Katsuhiko Kohyama, Tsurugashima (JP)

(73) Assignee: Honda Motor Co., Ltd., Tokyo (JP)

( * ) Notice: Subject to any disclaimer, the term of this patent is extended or adjusted under 35 U.S.C. 154(b) by 568 days.

(21) Appl. No.: 12/396,518

(22) Filed: Mar. 3, 2009

(65) Prior Publication Data

US 2009/0226789 A1    Sep. 10, 2009

(30) Foreign Application Priority Data

Mar. 6, 2008   (JP) ................................ 2008-055971

(51) Int. Cl.
*H01M 8/00*   (2006.01)
(52) U.S. Cl. ...................... 429/452; 429/433; 429/467
(58) Field of Classification Search ........................ None
See application file for complete search history.

(56) References Cited

U.S. PATENT DOCUMENTS

| | | | | |
|---|---|---|---|---|
| 5,370,711 | A | * | 12/1994 | Audit et al. ................... 29/623.1 |
| 5,798,906 | A | * | 8/1998 | Ando et al. ................... 361/520 |
| 6,329,093 | B1 | * | 12/2001 | Ohara et al. ................... 429/437 |
| 6,410,177 | B1 | * | 6/2002 | Iyasu et al. ................... 429/434 |
| 6,670,069 | B2 | * | 12/2003 | Allen ............................. 429/459 |
| 7,384,703 | B2 | * | 6/2008 | Sato et al. ...................... 429/434 |
| 7,883,811 | B2 | * | 2/2011 | Kato et al. ..................... 429/443 |
| 7,951,505 | B2 | * | 5/2011 | Fukuda et al. ................. 429/513 |
| 2006/0166053 | A1 | * | 7/2006 | Badding et al. ................. 429/13 |

FOREIGN PATENT DOCUMENTS

| | | |
|---|---|---|
| JP | 59-35369 | 2/1984 |
| JP | 61-3671 | 1/1986 |
| JP | 61-7868 | 1/1986 |

* cited by examiner

*Primary Examiner* — Michael Zarroli
(74) *Attorney, Agent, or Firm* — Nelson Mullins Riley & Scarborough LLP; Anthony A. Laurentano (57) ABSTRACT

A fuel cell stack includes a stack body formed by stacking a plurality of power generation cells. A terminal, an insulating plate, and an end plate are provided at one end of the stack body, and a terminal, an insulating plate, and an end plate are provided at the other end of the stack body. Each of the terminals includes an electrically conductive plate member, and an electrically conductive rod terminal joined integrally with the electrically conductive plate member. A joint portion joining the electrically conductive plate member and the electrically conductive rod terminal is formed by friction stir welding.

2 Claims, 7 Drawing Sheets

FUEL CELL STACK WITH POWER COLLECTING TERMINALS

BACKGROUND OF THE INVENTION

1. Field of the Invention

The present invention relates to a fuel cell stack including a stack body formed by stacking a plurality of power generation cells in a stacking direction. Each of the power generation cells includes an electrolyte electrode assembly and separators. The electrolyte electrode assembly includes a pair of electrodes and an electrolyte interposed between the electrodes. Power collecting terminals are provided at opposite ends of the stack body in the stacking direction. Further, the present invention relates to a method of producing the terminal of the fuel cell stack.

2. Description of the Related Art

For example, a solid polymer electrolyte fuel cell employs an electrolyte membrane (electrolyte). The electrolyte membrane is a polymer ion exchange membrane. A membrane electrode assembly (electrolyte electrode assembly) includes an anode, a cathode, and the electrolyte membrane interposed between the anode and the cathode. The membrane electrode assembly and separators sandwiching the membrane electrode assembly make up a unit of a fuel cell (power generation cell) for generating electricity. In use of the polymer electrolyte fuel cell, a predetermined number of power generation cells are stacked together to form a fuel cell stack.

In the fuel cell stack, normally, terminal plates, insulating plates, and end plates are provided at opposite ends of a stack body formed by stacking a plurality of power generation cells in the stacking direction. The terminal plates have power collecting terminals for collecting electrical energy from the stack body to the outside. The power collecting terminals are connected to a contactor (or a relay) to implement the ON/OFF control for supplying electrical energy to an external load such as a motor.

Figure 7:
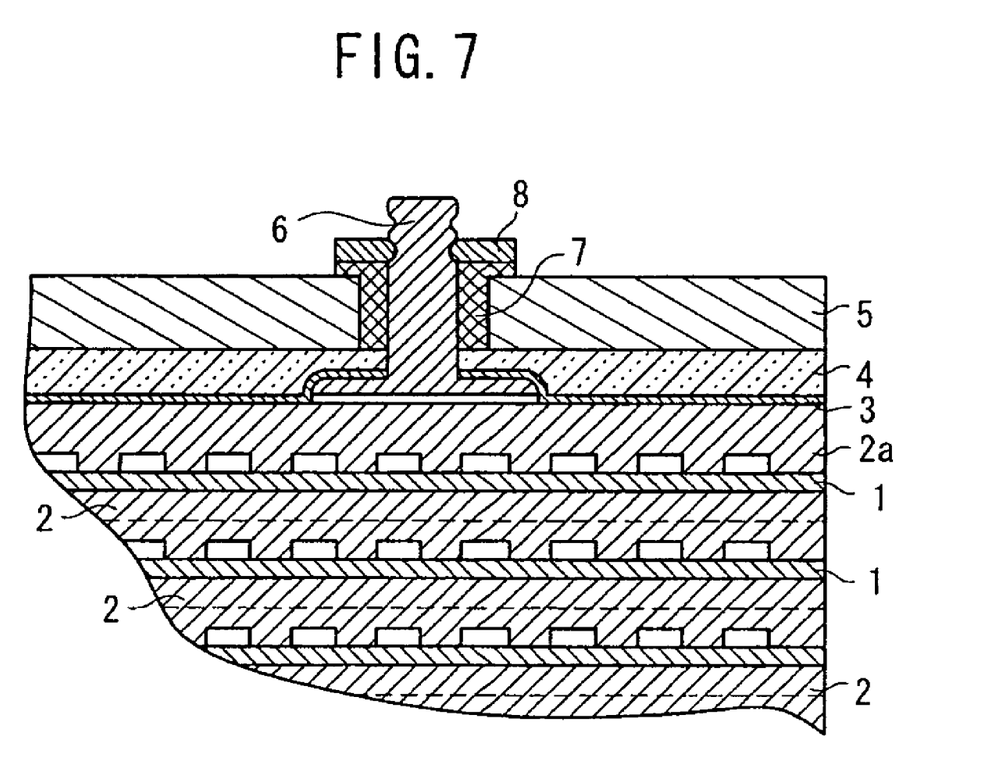
FIG. 7 is a cross sectional view showing a conventional terminal device.

For example, in a terminal device of a fuel cell disclosed in Japanese Laid-Open Utility Model Publication No. 61-007868, as shown in FIG. 7, unit cells 1 and bipolar plates 2 are stacked alternately, and half plates 2a are provided at opposite ends in the stacking direction. Terminal plates 3 are provided outside the half plates 2a, and insulating plates 4 are provided outside the terminal plates 3. Further, end plates 5 are provided outside the insulating plates 4.

An electrode pole (power collecting terminal) 6 is electrically connected to each of the terminal plates 3. The electrode pole 6 passes through the insulating plate 4 and the end plate 5 to the outside. The electrode pole 6 is inserted into an insulating sleeve 7, and fixed through a nut 8.

However, in the above structure where the electrode pole 6 is simply connected to the terminal plate 3, the contact state tends to vary, and the current collection performance through the electrode pole 6 may be lowered undesirably. Further, since the electrode pole 6 is inserted into the insulating sleeve 7, and fixed through the nut 8, the assembling operation is laborious, and a large number of components are required.

SUMMARY OF THE INVENTION

The present invention has been made to solve the problems of this type, and an object of the present invention is to provide a fuel cell stack and a method of producing a terminal for the fuel cell stack in which, with simple steps and structure, it is possible to efficiently and economically produce the terminal having good current collection performance.

The present invention relates to a fuel cell stack including a stack body formed by stacking a plurality of power generation cells in a stacking direction. Each of the power generation cells includes an electrolyte electrode assembly and separators. The electrolyte electrode assembly includes a pair of electrodes and an electrolyte interposed between the electrodes. Power collecting terminals are provided at opposite ends of the stack body in the stacking direction.

Each of the terminals includes an electrically conductive plate member and an electrically conductive rod terminal joined integrally to a flat surface of the electrically conductive plate member, and a joint portion joining the electrically conductive plate member and the electrically conductive rod terminal is formed by friction stir welding.

Further, the present invention relates to a method of producing a terminal for a fuel cell stack including a stack body formed by stacking a plurality of power generation cells in a stacking direction. Each of the power generation cells includes an electrolyte electrode assembly and separators. The electrolyte electrode assembly includes a pair of electrodes and an electrolyte interposed between the electrodes. Power collecting terminals are provided at opposite ends of the stack body in the stacking direction.

In the production method, an electrically conductive rod terminal is joined integrally to a flat surface of the electrically conductive plate member by friction stir welding for producing the terminal.

In the present invention, the electrically conductive plate member and the electrically conductive rod terminal are joined together by friction stir welding. The friction stir welding (FSW: Friction Stir Welding) is a technique of joining two workpieces in the solid state together by utilizing friction heat generated at the time of inserting a rotating probe into a workpiece (object).

By the friction stir welding, flatness in the joint portion is improved, and it becomes possible to integrally join the electrically conductive plate member and the electrically conductive rod terminal suitably and reliably. Thus, the joined state of the terminal is suitably maintained, and the contact resistance can be reduced advantageously.

Further, reduction in the number of components can be achieved, and the terminals can be produced economically. Moreover, for example, in comparison with the case where the electrically conductive plate member and the electrically conductive rod terminal are fabricated into one piece by cutting, significant cost reduction is achieved. For example, in comparison with the case of adopting pressure forming, damages of the components can be reduced as much as possible.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
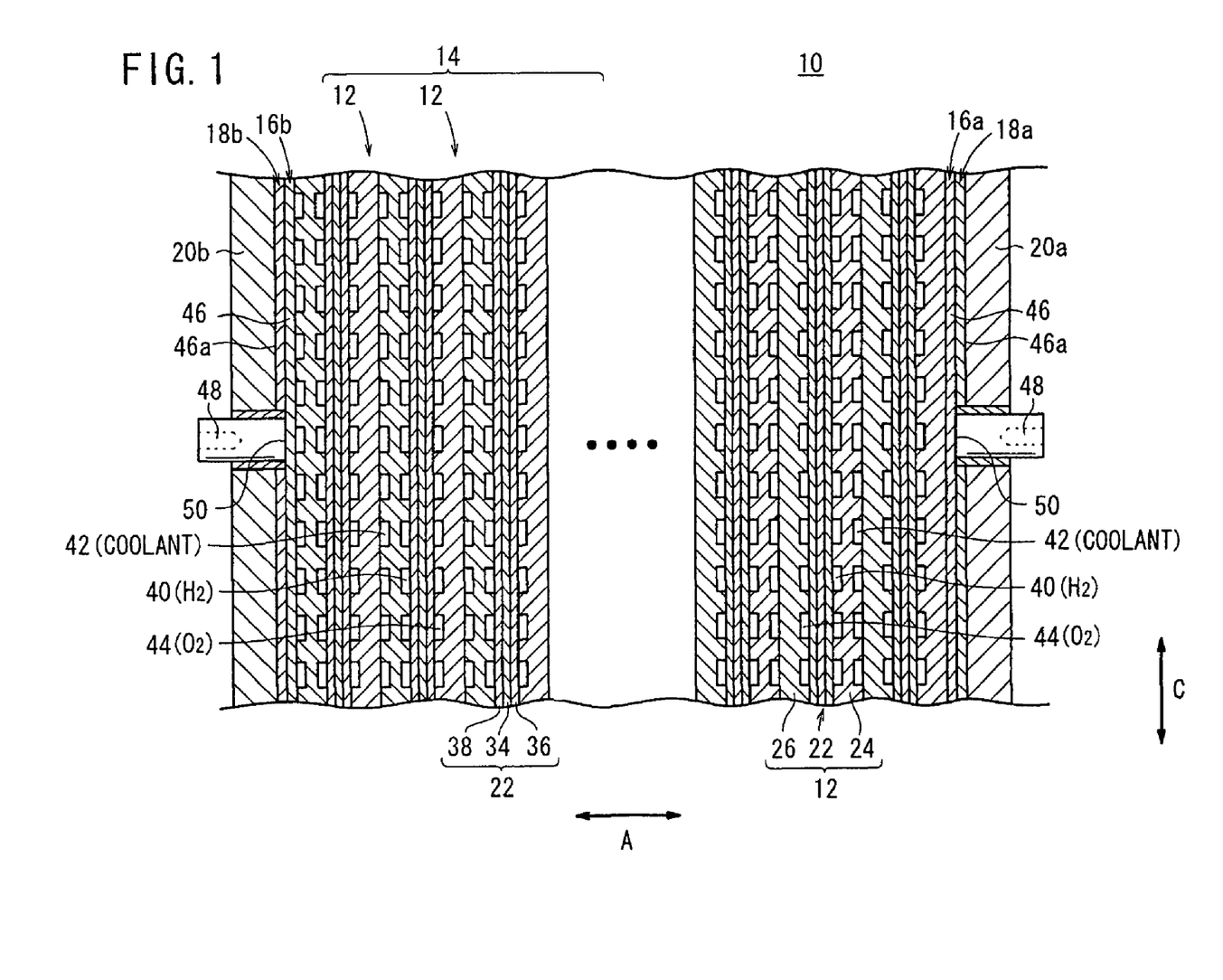
FIG. 1 is a cross sectional view showing a fuel cell stack according to an embodiment of the present invention.

As shown in FIG. 1, a fuel cell stack 10 according to an embodiment of the present invention has a stack body 14 formed by stacking a plurality of power generation cells 12 in a horizontal direction indicated by an arrow A. A terminal 16a is provided at one end of the stack body 14 in the stacking direction indicated by the arrow A. An insulating plate 18a is provided outside the terminal 16a, and an end plate 20a is provided outside the insulating plate 18a. A terminal 16b is provided at the other end of the stack body 14 in the stacking direction. An insulating plate 18b is provided outside the terminal 16b, and an end plate 20b is provided outside the insulating plate 18b. Components between the end plates 20a, 20b are tightened together through a plurality of tie rods (not shown).

Figure 2:
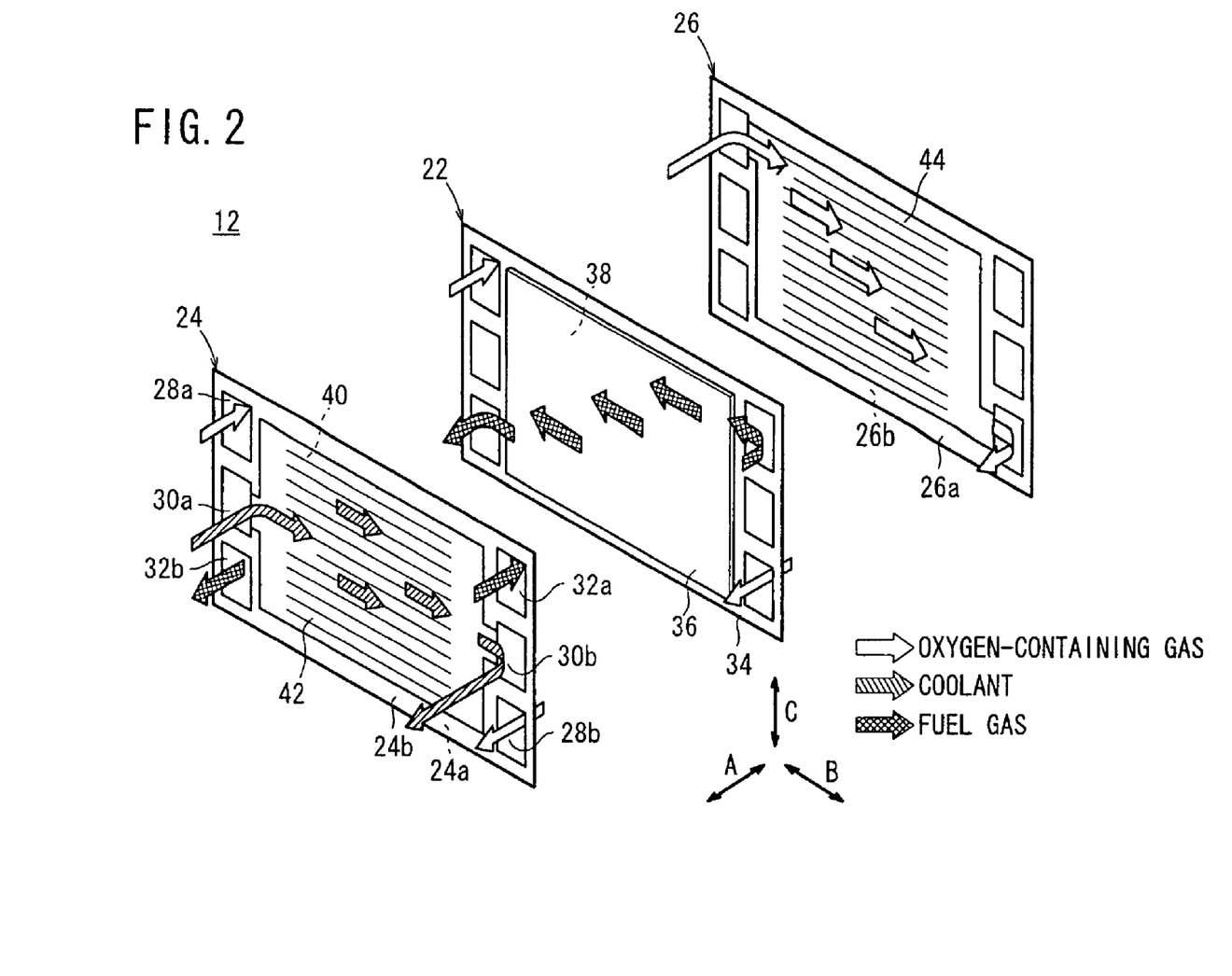
FIG. 2 is an exploded perspective view showing a power generation cell of the fuel cell stack.

As shown in FIG. 2, each of the power generation cells 12 includes a membrane electrode assembly 22 and first and second separators 24, 26 sandwiching the membrane electrode assembly 22. The first and second separators 24, 26 are carbon separators or metal separators.

At one end of the power generation cell 12 in the direction indicated by the arrow B, an oxygen-containing gas supply passage 28a for supplying an oxygen-containing gas, a coolant supply passage 30a for supplying a coolant, and a fuel gas discharge passage 32b for discharging a fuel gas such as a hydrogen-containing gas are provided. The oxygen-containing gas supply passage 28a, the coolant supply passage 30a, and the fuel gas discharge passage 32b extend through the power generation cell 12 in the direction indicated by the arrow A.

At the other end of the power generation cell 12 in the direction indicated by the arrow B, a fuel gas supply passage 32a for supplying the fuel gas, a coolant discharge passage 30b for discharging the coolant, and an oxygen-containing gas discharge passage 28b for discharging the oxygen-containing gas are provided. The fuel gas supply passage 32a, the coolant discharge passage 30b, and the oxygen-containing gas discharge passage 28b extend through the power generation cell 12 in the direction indicated by the arrow A.

The membrane electrode assembly 22 includes an anode 36, a cathode 38, and a solid polymer electrolyte membrane 34 interposed between the anode 36 and the cathode 38. The solid polymer electrolyte membrane 34 is formed by impregnating a thin membrane of perfluorosulfonic acid with water, for example.

Each of the anode 36 and the cathode 38 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 36 and the electrode catalyst layer of the cathode 38 are fixed to both surfaces of the solid polymer electrolyte membrane 34, respectively.

The first separator 24 has a fuel gas flow field 40 on a surface 24a facing the membrane electrode assembly 22. The fuel gas flow field 40 is connected between the fuel gas supply passage 32a and the fuel gas discharge passage 32b. For example, the fuel gas flow field 40 is formed by a plurality of grooves extending in a direction indicated by the arrow B. A coolant flow field 42 is formed on a surface 24b of the first separator 24. The coolant flow field 42 is connected between the coolant supply passage 30a and the coolant discharge passage 30b. The coolant flow field 42 is formed by a plurality of grooves extending in the direction indicated by the arrow B.

The second separator 26 has an oxygen-containing gas flow field 44 on a surface 26a facing the membrane electrode assembly 22. For example, the oxygen-containing gas flow field 44 includes a plurality of grooves extending in the direction indicated by the arrow B. The oxygen-containing gas flow field 44 is connected between the oxygen-containing gas supply passage 28a and the oxygen-containing gas discharge passage 28b. A surface 26b of the second separator 26 is overlapped on the surface 24b of the first separator 24 to form the coolant flow field 42. For example, gaskets (not shown) or the like are provided in the first and second separators 24, 26.

As shown in FIG. 1, each of the terminals 16a, 16b has an electrically conductive plate member 46 and an electrically conductive rod terminal 48 joined integrally with a flat surface 46a of the electrically conductive plate member 46. A joint portion 50 joining the electrically conductive plate member 46 and the electrically conductive rod terminal 48 is formed by friction stir welding.

Figure 3:
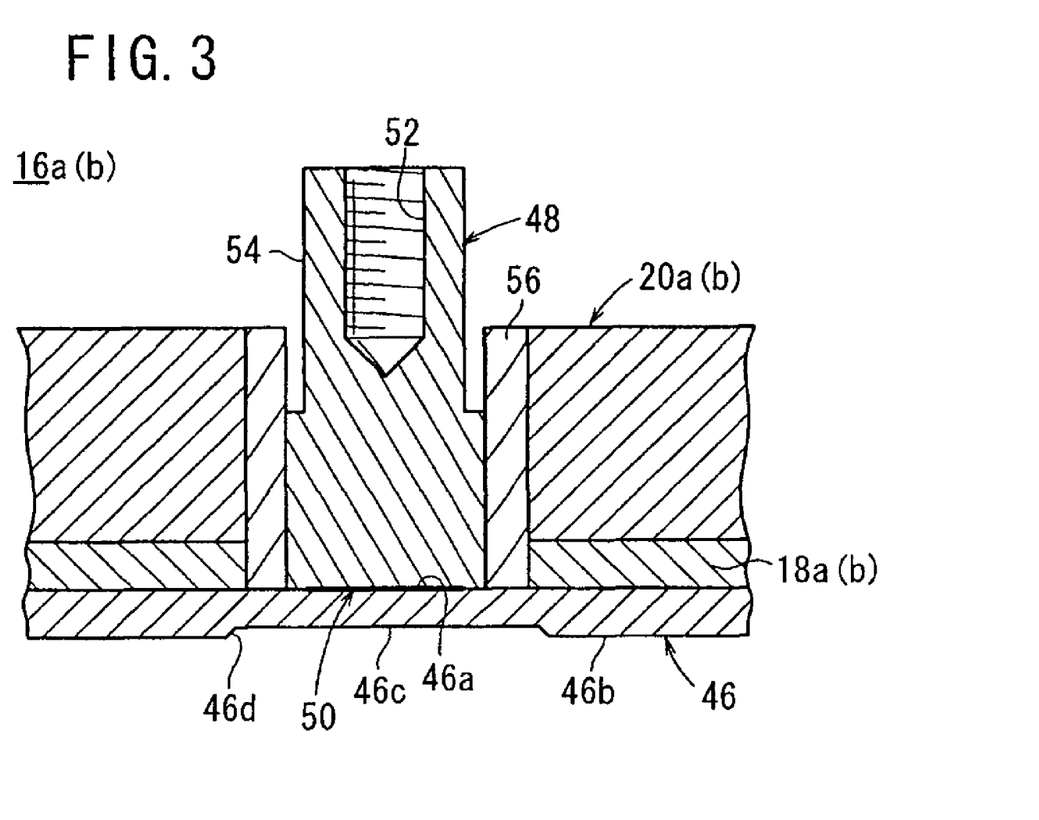
FIG. 3 is a cross sectional view showing a terminal of the fuel cell stack.

As shown in FIG. 3, in an inner flat surface 46b of the electrically conductive plate member 46 opposite to the flat surface 46a, a portion 46c corresponding to the joint portion 50 is recessed in the thickness direction of the electrically conductive plate member 46 from the other portion of the inner flat surface 46b through a step 46d.

Figure 4:
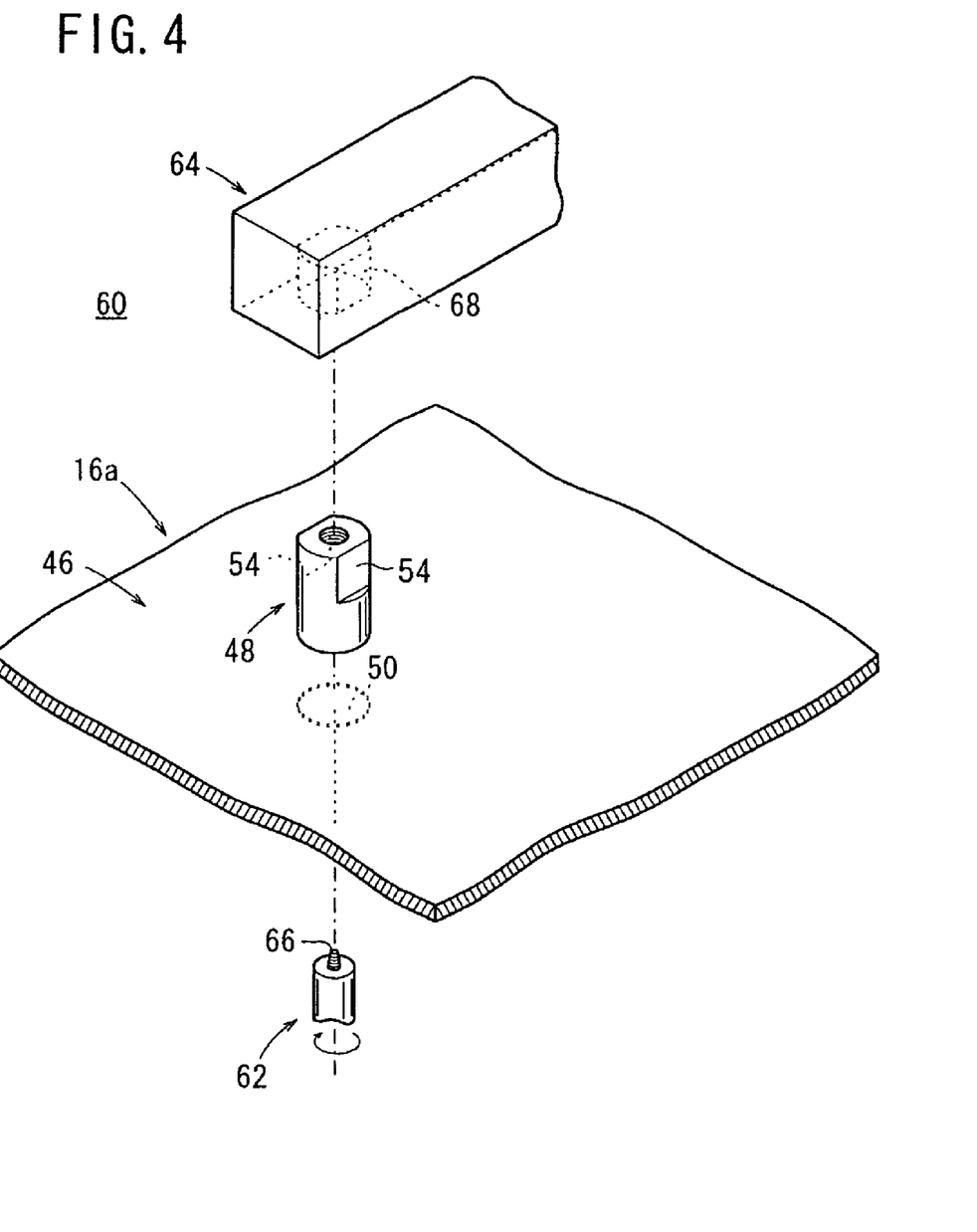
FIG. 4 is a perspective view schematically showing a friction stir welding device used in a terminal production method according to the embodiment of the present invention.

The electrically conductive rod terminal 48 has a screw hole 52 for fixing a bus bar or the like (not shown), and two flat surfaces 54 are formed on the circumferential surface of the electrically conductive rod terminal 48 for preventing rotation of the electrically conductive rod terminal 48 at the time of friction stir welding (see FIG. 4). The electrically conductive rod terminal 48 is inserted into the end plate 20a, 20b though an insulating sleeve 56.

Next, a method of producing the terminals 16a, 16b will be described. It should be noted that the terminals 16a, 16b are produced in the same manner. Therefore, only production of the terminal 16a will be described.

As shown in FIG. 4, a friction stir welding device 60 for joining the electrically conductive rod terminal 48 to the electrically conductive plate member 46 has a joining tool 62 and a jig 64. The joining tool 62 has a cylindrical shape, and a probe 66 is provided at the front end of the joining tool 62. The jig 64 forms backing metal, and has a fitting hole 68 corresponding to the outer shape of the electrically conductive rod terminal 48.

Figure 5:
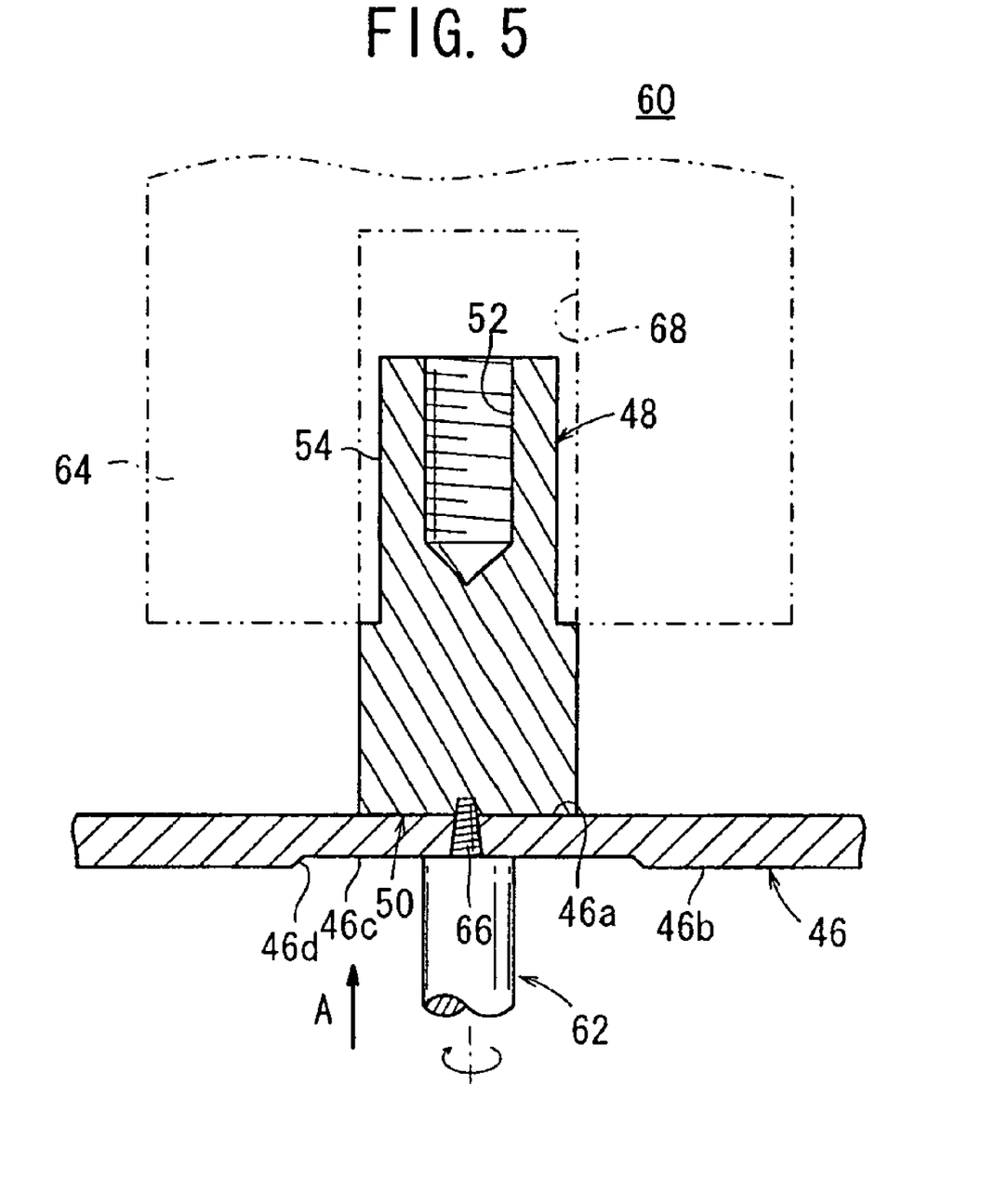
FIG. 5 is a view showing operation of the friction stir welding device.

Then, as shown in FIG. 5, the electrically conductive rod terminal 48 is inserted into the fitting hole 68 of the jig 64, and unrotatably supported. The electrically conductive rod terminal 48 and the electrically conductive plate member 46 are supported in a state where the electrically conductive rod terminal 48 and the electrically conductive plate member 46 tightly contact each other.

Then, the joining tool 62 is rotated at a predetermined rotation speed, and presses the probe 66 to the portion 46c corresponding to the joint portion 50 of the electrically conductive plate member 46 (in the direction indicated by the arrow A).

Then, the joining tool 62 is rotated, and moves along a predetermined tool path 70 (described later) to generate friction heat between the joining tool 62 and the electrically conductive plate member 46 and the electrically conductive rod terminal 48. Thus, the electrically conductive plate member 46 and the electrically conductive rod terminal 48 are joined together by friction stir welding. The parameter of the friction stir welding is determined corresponding to material and the plate thickness of the workpiece. For example, the rotation number of the joining tool 62 is in a range of 500 rpm to 3000 rpm, the pressure applied by the joining tool 62 is in a range of 5 kN to 50 kN, and the joining speed is in a range of 100 mm/min to 500 mm/min.

Figure 6:
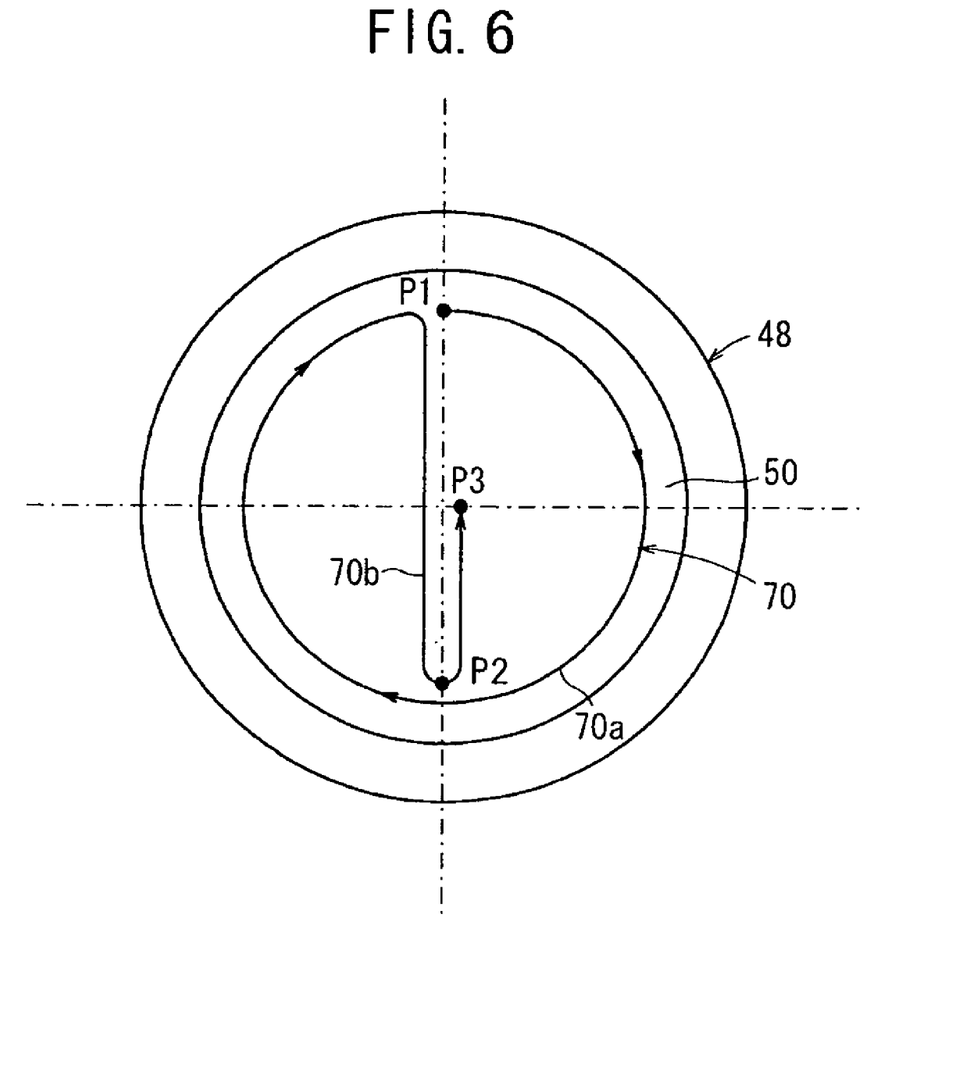
FIG. 6 is a view showing a tool path by the friction stir welding device.

In the embodiment, the joining tool 62 moves along the tool path 70 shown in FIG. 6. Specifically, firstly, the joining tool 62 is rotated, and presses the probe 66 to the joining start point P1 of a circular path 70a along the outer circumference of the electrically conductive rod terminal 48. From the joining start point P1, the joining tool 62 moves along the circular path 70a in the direction indicated by the arrow.

Thus, the probe 66 moves around the circular path 70a, and moves back to the joining start point P1. Thereafter, the probe 66 moves along a straight path 70b extending along the diameter of the electrically conductive rod terminal 48 from the joining start point P1. The probe 66 moves to a turning point P2 where the path is temporarily merged to the circular path 70a, and the probe 66 moves back at the turning point P2 to the straight path 70b. When the probe 66 reaches the joining end point P3 at the center of the electrically conductive rod terminal 48, the probe 66 is removed from the electrically conductive plate member 46. Thus, the electrically conductive plate member 46 and the electrically conductive rod terminal 48 are joined integrally by friction stir welding.

As shown in FIG. 1, the terminals 16a, 16b produced as described above are assembled into the fuel cell stack 10.

Operation of the fuel cell stack 10 will be described below.

In the power generation cell 12 of the fuel cell stack 10, as shown in FIG. 2, the oxygen-containing gas is supplied to the oxygen-containing gas supply passage 28a, and the fuel gas such as the hydrogen-containing gas is supplied to the fuel gas supply passage 32a. The coolant such as pure water or ethylene glycol is supplied to the coolant supply passage 30a.

Thus, the oxygen-containing gas flows from the oxygen-containing gas supply passage 28a into the oxygen-containing gas flow field 44 of the second separator 26, and the oxygen-containing gas flows along the cathode 38 of the membrane electrode assembly 22.

The fuel gas flows from the fuel gas supply passage 32a to the fuel gas flow field 40 of the first separator 24, and the fuel gas moves along the anode 36 of the membrane electrode assembly 22.

Thus, in each of the membrane electrode assemblies 22, the oxygen-containing gas supplied to the cathode 38, and the fuel gas supplied to the anode 36 are consumed in the electrochemical reactions at catalyst layers of the cathode 38 and the anode 36 for generating electricity.

The oxygen-containing gas consumed at the cathode 38 is discharged to the oxygen-containing gas discharge passage 28b. Likewise, the fuel gas consumed at the anode 36 is discharged to the fuel gas discharge passage 32b.

Further, the coolant flows from the coolant supply passage 30a into the coolant flow field 42 between the first and second separators 24, 26, and flows in the direction indicated by the arrow B. After the coolant cools the membrane electrode assembly 22, and the coolant is discharged into the coolant discharge passage 30b.

In the embodiment, the electrically conductive plate member 46 and the electrically conductive rod terminal 48 are joined together by friction stir welding to produce each of the terminals 16a, 16b. Therefore, flatness of the joint portion 50 between the electrically conductive plate member 46 and the electrically conductive rod terminal 48 is improved. The electrically conductive plate member 46 and the electrically conductive rod terminal 48 are suitably and reliably joined together. As a result, current collection performance in the terminals 16a, 16b is improved effectively.

Further, for example, since bolts and nuts are not used, the number of components is reduced, and the terminals 16a, 16b are produced economically.

Further, in comparison with the case of forming the terminals 16a, 16b integrally, e.g., by cutting, the production cost is reduced significantly. In comparison with the case of pressure forming, damages or the like of the components can be reduced as much as possible.

Further, in comparison with the case of welding, stable product quality can be achieved reliably, and the temperature at the time of production is relatively low. Therefore, in comparison with the case of welding, heat distortion or the like of the electrically conductive plate member 46 is suppressed, and improvement in the current collection performance is achieved.

Further, in the electrically conductive plate member 46, the portion 46c corresponding to the joint portion 50 is recessed in the thickness direction of the electrically conductive plate member 46 from the other portion of the inner flat surface 46b through the step 46d. Therefore, even if burrs are present in the portion 46c which is the movable range of the joining tool 62, the burrs do not protrude from the inner flat surface 46b toward the stack body 14. Therefore, the stack body 14 is not adversely affected by the joint surface.

Further, as shown in FIG. 6, the joining tool 62 moves along the tool path 70, and friction stir welding is finished at the joining end point P3 corresponding to the center of the electrically conductive rod terminal 48. Therefore, the trace of extracting the probe 66 is positioned at the center where torsional stress is small, and the sufficient joining strength at the joint portion 50 is achieved.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell stack including:
   a stack body formed by stacking a plurality of power generation cells in a stacking direction, the power generation cells each including an electrolyte electrode assembly and separators, the electrolyte electrode assembly including a pair of electrodes and an electrolyte interposed between the electrodes; and
   power collecting terminals provided at opposite ends of the stack body in the stacking direction,
   wherein each of the terminals includes:
      an electrically conductive plate member and an electrically conductive rod terminal joined integrally to a flat surface of the electrically conductive plate member,
      a joint portion joining the electrically conductive plate member and the electrically conductive rod terminal, and
   wherein in an inner flat surface of the electrically conductive plate member opposite to the flat surface, a portion corresponding to the joint portion is recessed in the thickness direction of the electrically conductive plate member from the other portion of the inner flat surface through a step.

2. A fuel cell stack according to claim 1, wherein a circumferential surface of the electrically conductive rod terminal includes a flat surface for preventing rotation of the electrically conductive rod terminal at the time the joint portion is formed.

* * * * *